(12) United States Patent
Bharatula et al.

(10) Patent No.: US 11,861,537 B2
(45) Date of Patent: Jan. 2, 2024

(54) METHOD AND SYSTEM FOR IDENTIFYING AND QUANTIFYING ORGANIZATIONAL WASTE

(71) Applicant: JPMorgan Chase Bank, N.A., New York, NY (US)

(72) Inventors: Naga Manjula Bharatula, Hyderabad (IN); Venkat Kalyan Solasa, Hyderabad (IN); Anilkumar Sudam, Hyderabad (IN); Veerendra Chowdary Kurra, Hyderabad (IN); Neel Kamal Pasi, Hyderabad (IN); Raji Reddy Ankilla, Secunderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/222,635

(22) Filed: Apr. 5, 2021

(65) Prior Publication Data

US 2022/0309423 A1 Sep. 29, 2022

(30) Foreign Application Priority Data

Feb. 19, 2021 (IN) .............................. 202111007069

(51) Int. Cl.
*G06Q 10/0631* (2023.01)
(52) U.S. Cl.
CPC . *G06Q 10/06312* (2013.01); *G06Q 10/06313* (2013.01)

(58) Field of Classification Search
CPC ....... G06Q 10/06312; G06Q 10/06313; G06Q 30/02; G06F 9/44; G06F 11/36
See application file for complete search history.

(56) References Cited

U.S. PATENT DOCUMENTS

| | | | | |
|---|---|---|---|---|
| 7,937,281 | B2* | 5/2011 | Miller | G06Q 10/0631 705/7.12 |
| 8,332,807 | B2* | 12/2012 | Finlayson | G06Q 10/06 717/124 |
| 8,539,437 | B2* | 9/2013 | Finlayson | G06F 21/6218 717/102 |
| 8,660,878 | B2* | 2/2014 | Bernardini | G06Q 10/06311 700/109 |
| 10,289,107 | B2* | 5/2019 | Warner | G05B 23/0208 |
| 2004/0093584 | A1* | 5/2004 | Le | G06F 9/50 717/110 |
| 2005/0114829 | A1* | 5/2005 | Robin | G06Q 10/06 717/101 |

(Continued)

*Primary Examiner* — Rutao Wu
*Assistant Examiner* — Stephen S Swartz
(74) *Attorney, Agent, or Firm* — Greenblum & Bernstein, P.L.C.

(57) ABSTRACT

A method for identifying, quantifying, classifying, and reducing resource waste in an organization is provided. The method includes: receiving a request from a user for identifying waste in a first software development project; identifying a set of tasks to be performed within the first software development project; determining, for each task, whether a waste of a resource such as cost and/or time has occurred; using Jira to tag each task for which a waste has been identified; and generating a report that indicates a result of the determination. The resulting report may be used to pinpoint a friction point within the organization.

20 Claims, 5 Drawing Sheets

(56) References Cited

U.S. PATENT DOCUMENTS

| | | | | |
|---|---|---|---|---|
| 2006/0235732 A1* | 10/2006 | Miller | .............. | G06Q 10/06313 |
| | | | | 705/7.23 |
| 2007/0083274 A1* | 4/2007 | Krauss | ................ | G06F 11/3466 |
| | | | | 714/E11.2 |
| 2016/0189174 A1* | 6/2016 | Heath | ................ | G06Q 30/0201 |
| | | | | 705/7.29 |
| 2020/0379879 A1* | 12/2020 | Plotnik | .................. | G06N 20/00 |

* cited by examiner

METHOD AND SYSTEM FOR IDENTIFYING AND QUANTIFYING ORGANIZATIONAL WASTE

CROSS-REFERENCE TO RELATED APPLICATIONS

This application claims priority benefit from Indian Application No. 202111007069, filed Feb. 19, 2021, which is hereby incorporated by reference in its entirety.

BACKGROUND

Field of the Disclosure

This technology generally relates to methods and systems for detecting and quantifying organizational waste, and more particularly to methods and systems for identifying, quantifying, classifying, and reducing organizational waste in real time.

Background Information

Engineers and computer programmers frequently endeavor to develop software for various purposes. In a large organization, engineers often work on projects that interact with existing software suites and with other ongoing projects. As a result, there is a waste of resources that arises due to interdependencies and follow-ups that engineers encounter during the development life cycle.

Accordingly, there is a need for a mechanism to identify, classify, and quantify wastages of time, money, and effort in a software development life cycle, and to radiate the gravity of friction points across an organization in order to efficiently prioritize the friction points.

SUMMARY

The present disclosure, through one or more of its various aspects, embodiments, and/or specific features or sub-components, provides, inter alia, various systems, servers, devices, methods, media, programs, and platforms for identifying, quantifying, classifying, and reducing organizational waste in real time.

According to an aspect of the present disclosure, a method for identifying, quantifying, classifying, and reducing organizational waste in real time is provided. The method is implemented by at least one processor. The method includes: receiving, by the at least one processor from a user, a request for identifying waste in a first software development project; identifying, by the at least one processor, a plurality of tasks to be performed within the first software development project; determining, for each task from among the identified plurality of tasks by the at least one processor, whether a waste of at least one resource has occurred; generating, by the at least one processor, a report that indicates a result of the determining; and transmitting, by the at least one processor, the generated report to the user.

The at least one resource may include at least one from among a cost, an amount of time spent by a person, and an amount of effort exerted by the person.

The at least one resource may include a number of hours spent by the person on each task.

The determining may include determining a planned amount of the at least one resource that is expected to be expended for each task, and determining an actual amount of the at least one resource that has been expended.

When the actual amount of the at least one resource that has been expended exceeds the planned amount of the at least one resource that is expected to be expended, the report may include information indicating a wastage amount that corresponds to a difference between the actual amount and the planned amount and an identification of the person that corresponds to the wastage amount.

The identifying of the plurality of tasks may include using an issue tracking tool, such as, for example, Jira, to identify the plurality of tasks.

The method may further include using the issue tracking tool to provide a label for each identified task based on a result of the determining.

The method may further include using the issue tracking tool to provide a label for each identified task for which the waste of the at least one resource is determined as having occurred.

The using of the issue tracking tool to provide the label may include tagging each identified task for which the waste of the at least one resource is determined as having occurred with a keyword from among a predetermined plurality of keywords.

The method may further include identifying at least one friction point that corresponds to an aspect of the organization associated with excessive waste based on information included in the generated report.

According to another exemplary embodiment, a computing apparatus for identifying, quantifying, classifying, and reducing organizational waste in real time is provided. The computing apparatus includes a processor; a memory; and a communication interface coupled to each of the processor and the memory. The processor is configured to: receive, via the communication interface from a user, a request for identifying waste in a first software development project; identify a plurality of tasks to be performed within the first software development project; determine, for each task from among the identified plurality of tasks, whether a waste of at least one resource has occurred; generate a report that indicates a result of the determining; and transmit, via the communication interface, the generated report to the user.

The at least one resource may include at least one from among a cost, an amount of time spent by a person, and an amount of effort exerted by the person.

The at least one resource may include a number of hours spent by the person on each task.

The processor may be further configured to determine a planned amount of the at least one resource that is expected to be expended for each task, and to determine an actual amount of the at least one resource that has been expended.

When the actual amount of the at least one resource that has been expended exceeds the planned amount of the at least one resource that is expected to be expended, the report may include information indicating a wastage amount that corresponds to a difference between the actual amount and the planned amount and an identification of the person that corresponds to the wastage amount.

The processor may be further configured to use an issue tracking tool, such as, for example, Jira, to identify the plurality of tasks.

The processor may be further configured to use the issue tracking tool to provide a label for each identified task based on a result of the determining.

The processor may be further configured to use the issue tracking tool to provide a label for each identified task for which the waste of the at least one resource is determined as having occurred.

The processor may be further configured to tag each identified task for which the waste of the at least one resource is determined as having occurred with a keyword from among a predetermined plurality of keywords.

The processor may be further configured to identify at least one friction point that corresponds to an aspect of the organization associated with excessive waste based on information included in the generated report.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
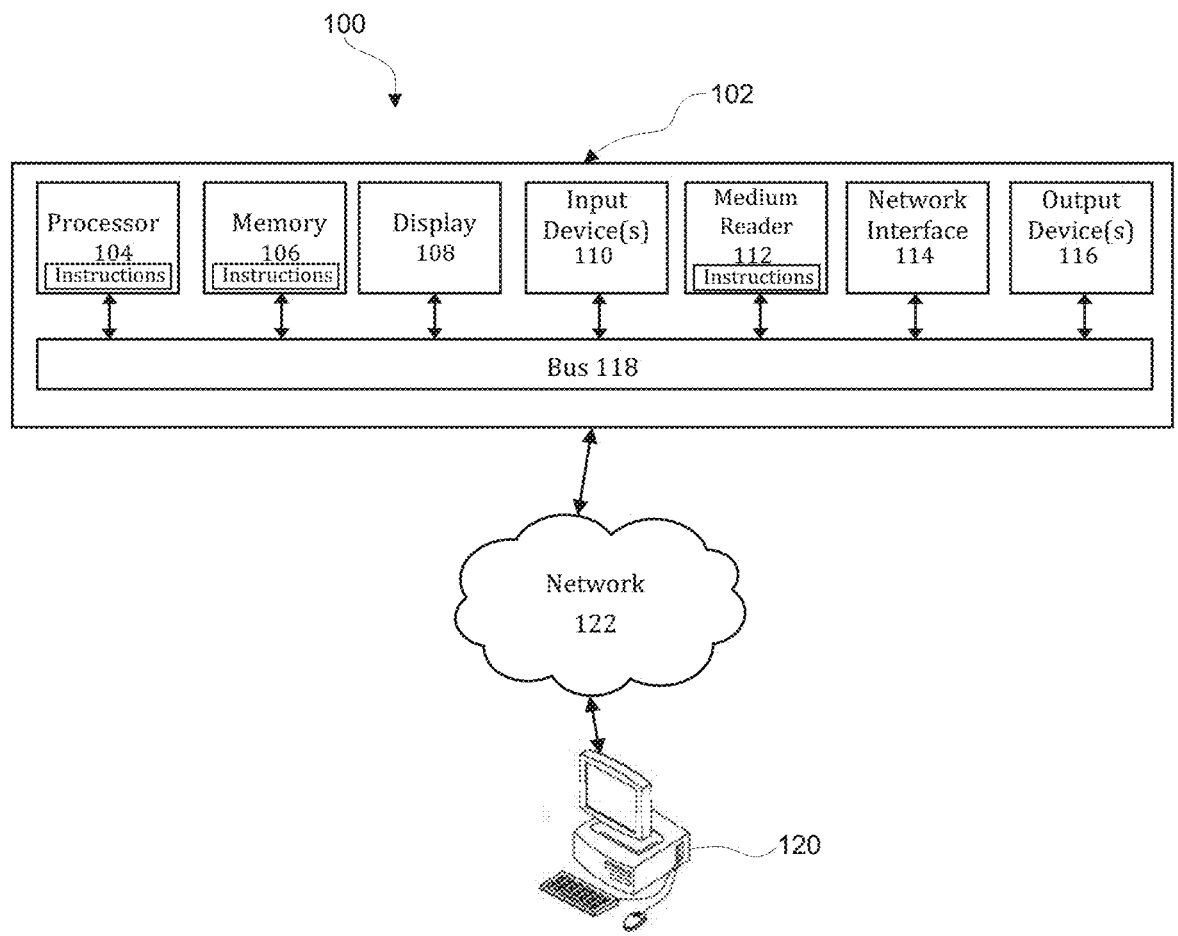
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for identifying, quantifying, classifying, and reducing organizational waste in real time.

Figure 2:
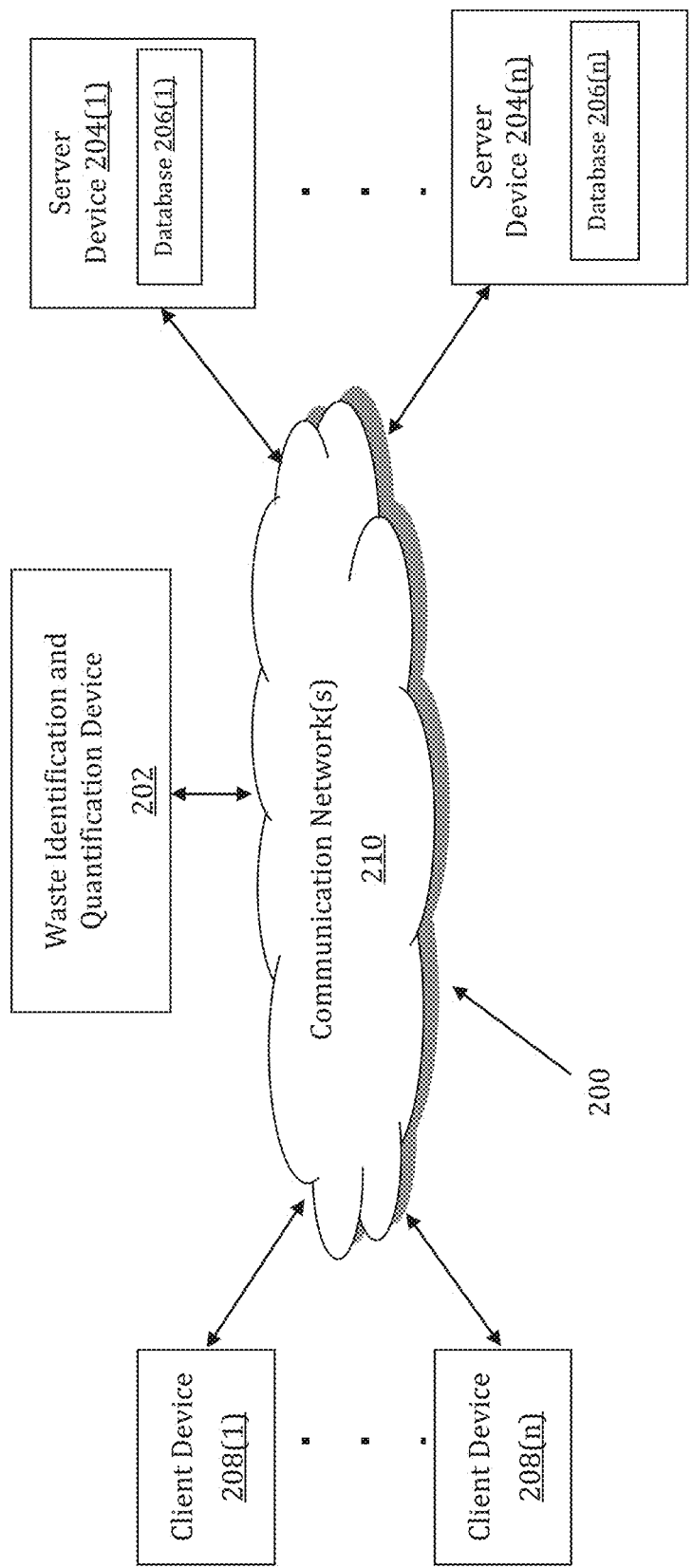
FIG. 2 illustrates an exemplary diagram of a network environment.

Referring to FIG. 2, a schematic of an exemplary network environment 200 for implementing a method for identifying, quantifying, classifying, and reducing organizational waste in real time is illustrated. In an exemplary embodiment, the method is executable on any networked computer platform, such as, for example, a personal computer (PC).

The method for identifying, quantifying, classifying, and reducing organizational waste in real time may be implemented by a Waste Identification and Quantification (WIQ) device 202. The WIQ device 202 may be the same or similar to the computer system 102 as described with respect to FIG. 1. The WIQ device 202 may store one or more applications that can include executable instructions that, when executed by the WIQ device 202, cause the WIQ device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the WIQ device 202 itself, may be located in virtual server(s) running in a cloud-based computing environment rather than being tied to one or more specific physical network computing devices. Also, the application(s) may be running in one or more virtual machines (VMs) executing on the WIQ device 202. Additionally, in one or more embodiments of this technology, virtual machine(s) running on the WIQ device 202 may be managed or supervised by a hypervisor.

In the network environment 200 of FIG. 2, the WIQ device 202 is coupled to a plurality of server devices 204(1)-204(n) that hosts a plurality of databases 206(1)-206(n), and also to a plurality of client devices 208(1)-208(n) via communication network(s) 210. A communication interface of the WIQ device 202, such as the network interface 114 of the computer system 102 of FIG. 1, operatively couples and communicates between the WIQ device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the WIQ device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and WIQ devices that efficiently implement a method for identifying, quantifying, classifying, and reducing organizational waste in real time.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The WIQ device 202 may be a standalone device or integrated with one or more other devices or apparatuses, such as one or more of the server devices 204(1)-204(n), for example. In one particular example, the WIQ device 202 may include or be hosted by one of the server devices 204(1)-204(n), and other arrangements are also possible. Moreover, one or more of the devices of the WIQ device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the WIQ device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to software development project management and data that relates to personnel and operational issues in connection with the software development lifecycle.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the WIQ device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the WIQ device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the WIQ device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the WIQ device 202, the server devices 204(1)-204(n), or the client devices 208(1)-208(n), for example, may be configured to operate as virtual instances on the same physical machine. In other words, one or more of the WIQ device 202, the server devices 204(1)-204(n), or the client devices 208(1)-208(n) may operate on the same physical device rather than as separate devices communicating through communication network(s) 210. Additionally, there may be more or fewer WIQ devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
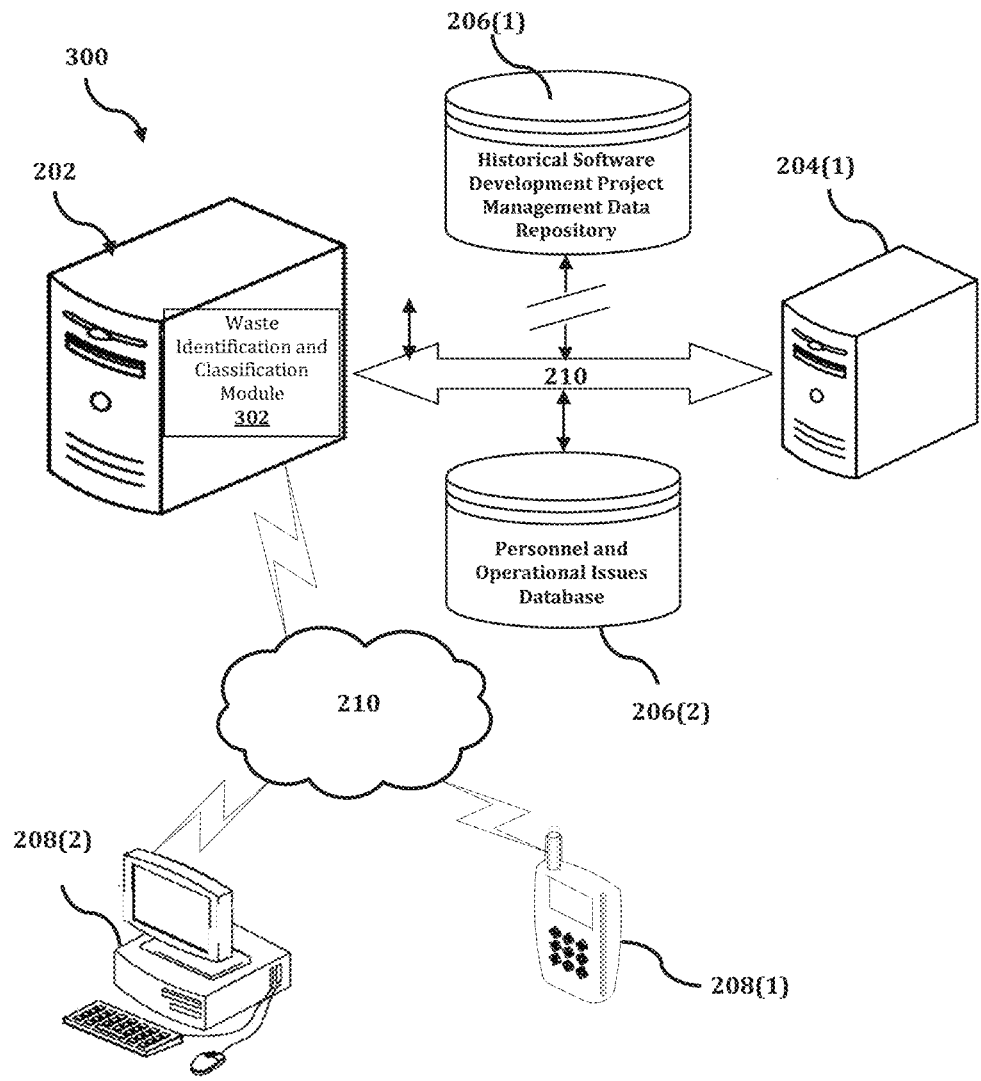
FIG. 3 shows an exemplary system for implementing a method for identifying, quantifying, classifying, and reducing organizational waste in real time.

The WIQ device 202 is described and illustrated in FIG. 3 as including a waste identification and classification module 302, although it may include other rules, policies, modules, databases, or applications, for example. As will be described below, the waste identification and classification module 302 is configured to implement a method for identifying, quantifying, classifying, and reducing organizational waste in real time.

An exemplary process 300 for implementing a mechanism for identifying, quantifying, classifying, and reducing organizational waste in real time by utilizing the network environment of FIG. 2 is illustrated as being executed in FIG. 3. Specifically, a first client device 208(1) and a second client device 208(2) are illustrated as being in communication with WIQ device 202. In this regard, the first client device 208(1) and the second client device 208(2) may be "clients" of the WIQ device 202 and are described herein as such. Nevertheless, it is to be known and understood that the first client device 208(1) and/or the second client device 208(2) need not necessarily be "clients" of the WIQ device 202, or any entity described in association therewith herein. Any additional or alternative relationship may exist between either or both of the first client device 208(1) and the second client device 208(2) and the WIQ device 202, or no relationship may exist.

Further, WIQ device 202 is illustrated as being able to access a historical software development project management data repository 206(1) and a personnel and operational issues database 206(2). The waste identification and classification module 302 may be configured to access these databases for implementing a method for identifying, quantifying, classifying, and reducing organizational waste in real time.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the WIQ device 202 via broadband or cellular communication. Of course, these embodiments are merely exemplary and are not limiting or exhaustive.

Upon being started, the waste identification and classification module 302 executes a process for identifying, quantifying, classifying, and reducing organizational waste in real time. An exemplary process for identifying, quantifying, classifying, and reducing organizational waste in real time is generally indicated at flowchart 400 in FIG. 4.

Figure 4:
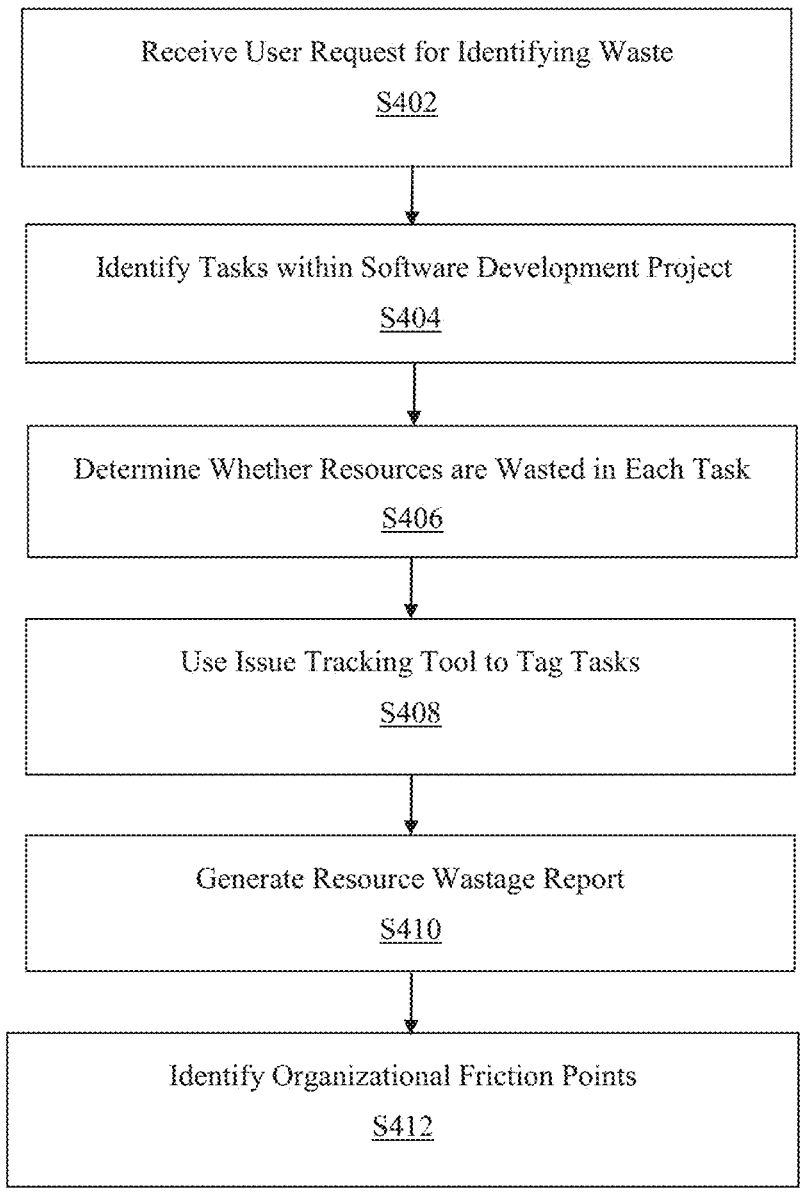
FIG. 4 is a flowchart of an exemplary process for implementing a method for identifying, quantifying, classifying, and reducing organizational waste in real time.

In process 400 of FIG. 4, at step S402, the waste identification and classification module 302 receives a user request to identify, quantify, and classify waste in the context of a software development project. Then, at step S404, the waste identification and classification module 302 identifies a plurality of tasks to be performed within the software development project. In an exemplary embodiment, the identification of the tasks may be performed by using an issue tracking tool, such as, for example, Jira, which is a widely used software application used for issue tracking and project management.

At step S406, the waste identification and classification module 302 determines, for each task, whether a waste of resources has occurred. In an exemplary embodiment, the resources may include any one or more of a cost, an amount of time spent by a person, such as an engineer who is working on the software development project, and/or an amount of effort expended by the person. For example, for Project X, there may be three tasks: Task A, Task B, and Task C; and Engineer Z may have been assigned to work on Task A and Task C. In this scenario, the waste identification and classification module 302 may determine that the planned amount of time expected to be expended by Engineer Z on Task A was H hours and that the actual amount of time spent by Engineer Z on Task A was H+2.5 hours, and that the planned amount of time expected to be expended by Engineer Z on Task C was J hours and the actual amount of time spent by Engineer Z on Task C was J+0.8 hours. As a result, the waste identification and classification module 302 would determine that for Task A, there are 2.5 man-hours of waste that are associated with Engineer Z, and for Task C, there are 0.8 man-hours of waste that are associated with Engineer Z.

At step S408, the waste identification and classification module 302 uses the issue tracking tool (e.g., Jira) to provide a label, also referred to herein as a tag, to at least some of the tasks. In an exemplary embodiment, the tag may include alphanumeric text, symbols, and/or codes to convey information that corresponds to the determinations made in step S406. In this aspect, when using Jira, a predefined set of keywords and codes may be used in tagging each task. For example, a tag may have a predetermined data structure that includes a category field, a sub-category field, and a number of wasted hours field, and the waste identification and classification module 302 may select entries for each field from a predefined set of keywords, codes, and symbols.

In an exemplary embodiment, a tag may be provided only for tasks that have been determined as having an associated waste of resources, and tasks for which no waste has been identified may not be tagged. Alternatively, a tag may be provided for all tasks identified as being within the software development project, regardless of whether any corresponding waste has been identified.

At step S410, the waste identification and classification module 302 generates a resource wastage report. In an exemplary embodiment, the resource wastage report includes information that identifies amounts of various resources that have been wasted for each task in the project. The resource wastage report is then transmitted to the user that submitted the request in step S402.

At step S412, the waste identification and classification module 302 uses the results of the waste identification, quantification, and classification process to identify organizational friction points. In an exemplary embodiment, the waste identification and classification module 302 may use information included in the resource wastage report in conjunction with historical information that is stored in the historical software development project management data repository 206(1) to analyze patterns of data in order to identify individual persons and/or groups within the organization that are associated with identified resource wastages.

Figure 5:
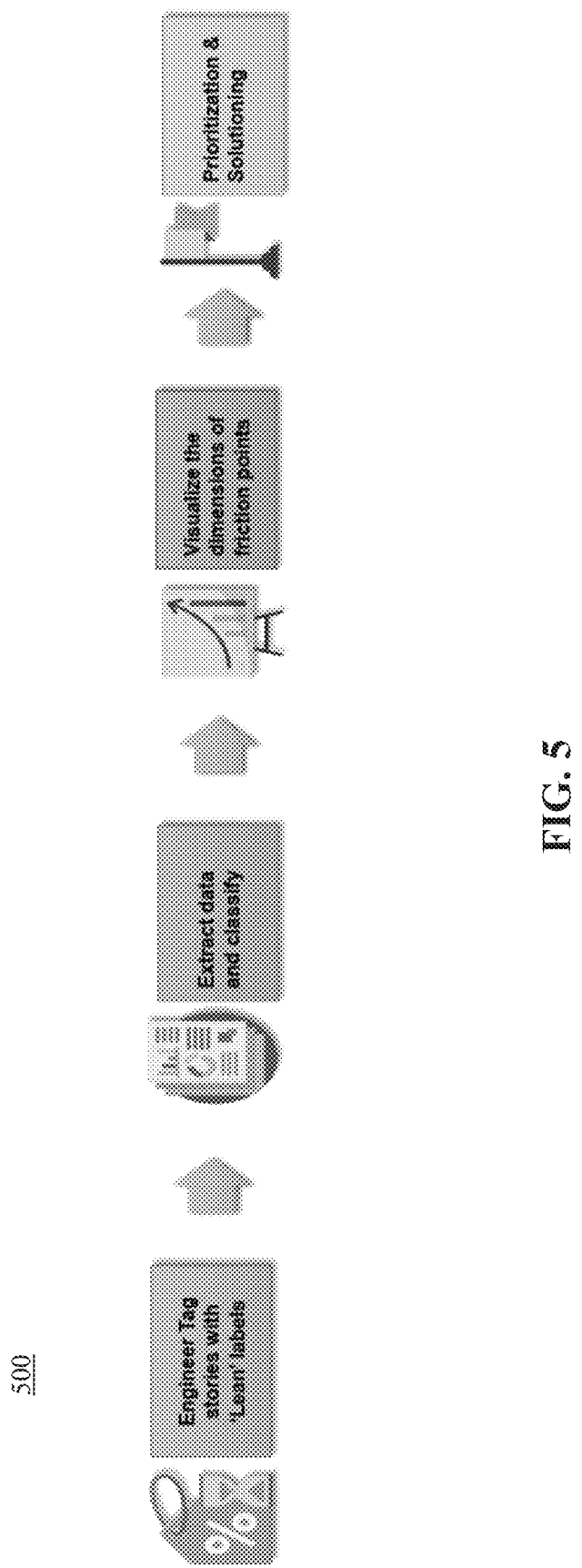
FIG. 5 is a process flow diagram of a method for identifying, quantifying, classifying, and reducing organizational waste in real time, according to an exemplary embodiment.

FIG. 5 is a process flow diagram 500 of a method for identifying, quantifying, classifying, and reducing organizational waste in real time by using Jira, according to an exemplary embodiment. As illustrated in the process flow diagram 500, in a first stage, a software development project is depicted as a set of Jira stories, and each Jira story is tagged with a label that provides data indicating resource waste that has been identified and quantified. In a second stage, the data is extracted from the labels and classified. In a third stage, the data is analyzed in order to visualize the dimensions of friction points within the organization. In a fourth stage, the identified wastages and friction points are used to prioritize issues to be addressed and potential solutions to be applied within the organization, in order to reduce future resource waste and to enhance engineer experience.

Accordingly, with this technology, an optimized process for identifying, quantifying, classifying, and reducing organizational waste in real time is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for reducing resource waste in an organization, the method being implemented by a computer system, the method comprising:
   storing, in a historical software development project management database at a first area of a network, historical information for identifying, quantifying, and classifying the resource waste in the organization;
   storing, in a personnel and operational issues database at a second area of the network, data that relates to personnel and operational issues in connection with a software development lifecycle;
   receiving, via the network and by the computer system from a voice-to-text application of a user device at a third area of the network, a request for identifying waste in a first software development project;
   identifying, by the computer system, which uses and includes an issue tracking tool as a software application, a plurality of tasks to be performed within the first software development project;
   determining, by the computer system, using a proximity sensor included in the computer, for each task from among the plurality of tasks identified by the computer system, whether a waste of at least one resource has occurred by determining whether a planned amount of time expected to be spent by a person on each task exceeds an actual amount of time spent by the person;
   tagging, by the computer system, which uses and includes a global positioning system device and the issue tracking tool, each of the plurality of tasks with an electronic tag, the electronic tag including a predetermined data structure, the predetermined data structure including a category field, a sub-category field, and a resource wasted field, the resource wasted field indicating the waste of the at least one resource, the waste of the at least one resource being associated with a person, an entry for each of the category field, the sub-category field, and the resource wasted field being selected from a predefined set of codes;
   extracting, by the computer system and from the electronic tag of each of the plurality of tasks, data from the predetermined data structure and generating, by the computer system, a report that indicates a result of the determining, the tagging, and the extracting;
   using, by the computer system, the report in conjunction with accessing the historical information that is stored in the historical software development project management database and the data that relates to personnel and operational issues that is stored in the personnel and operational issues database to analyze patterns of data in order to identify at least one individual person or group within the organization that is associated with the waste of the at least one resource in real time; and
   transmitting, via the network and by the computer system, the generated report to the user device,
   wherein, in the identifying, the first software development project is depicted as a set of Jira stories, the set of Jira stories including the plurality of tasks to be performed within the first software development project.

2. The method of claim 1, wherein the at least one resource includes at least one from among a cost, an amount of time spent by the person, and an amount of effort exerted by the person.

3. The method of claim 2, wherein the at least one resource includes a number of hours spent by the person on each task.

4. The method of claim 2, wherein the determining comprises determining a planned amount of the at least one resource that is expected to be expended for each task, and determining an actual amount of the at least one resource that has been expended.

5. The method of claim 4, wherein when the actual amount of the at least one resource that has been expended exceeds the planned amount of the at least one resource that is expected to be expended, the report includes information indicating a wastage amount that corresponds to a difference between the actual amount and the planned amount and an identification of the person that corresponds to the wastage amount.

6. The method of claim 1, wherein the identifying of the plurality of tasks comprises using the issue tracking tool, as the software application used for issue tracking and project management, to identify the plurality of tasks.

7. The method of claim 6, further comprising using the issue tracking tool to provide the electronic tag for each identified task based on a result of the determining.

8. The method of claim 6, further comprising using the issue tracking tool to provide the electronic tag for each identified task for which the waste of the at least one resource is determined as having occurred.

9. The method of claim 8, wherein the using of the issue tracking tool to provide the electronic tag comprises tagging each identified task for which the waste of the at least one resource is determined as having occurred with a key word from among a predetermined plurality of keywords.

10. The method of claim 1, further comprising identifying at least one friction point that corresponds to an aspect of the organization associated with excessive waste based on information included in the generated report.

11. A computing apparatus for reducing resource waste in an organization, the computing apparatus comprising:
   a processor;
   a memory that stores an issue tracking tool;
   a sensor;
   a global positioning system;
   a historical software development project management database that stores, at a first area of a network, historical information for identifying, quantifying, and classifying the resource waste in the organization;
   a personnel and operational issues database that stores, at a second area of the network, data that relates to personnel and operational issues in connection with a software development lifecycle; and a communication interface coupled to each of the processor and the memory, wherein the processor is configured to:
  receive, via the network and the communication interface from a voice-to-text application of a user device at a third area of the network, a request for identifying waste in a first software development project;
  identify, using the issue tracking tool as a software application, a plurality of tasks to be performed within the first software development project;
  determine, using the sensor, for each task from among the identified plurality of tasks, whether a waste of at least one resource has occurred;
  tag, using the global positioning system device and the issue tracking tool, each of the plurality of tasks with an electronic tag, the electronic tag including a predetermined data structure, the predetermined data structure including a category field, a sub-category field, and a resource wasted field, the resource wasted field indicating the waste of the at least one resource, the waste of the at least one resource being associated with a person, an entry for each of the category field, the sub-category field, and the resource wasted field being selected from a predefined set of codes;
  extract, from the electronic tag of each of the plurality of tasks, data from the predetermined data structure and generate a report that indicates a result of the determine, the tag, and the extract;
  use the report in conjunction with accessing the historical information that is stored in the historical software development project management database and the data that relates to personnel and operational issues that is stored in the personnel and operational issues database to analyze patterns of data in order to identify at least one individual person or group within the organization that is associated with the waste of the at least one resource in real time; and
  transmit, via the network and by the communication interface, the generated report to the user, and
wherein, in identifying the plurality of tasks, the processor depicts the first software development project as a set of Jira stories, the set of Jira stories including the plurality of tasks to be performed within the first software development project.

12. The computing apparatus of claim 11, wherein the at least one resource includes at least one from among a cost, an amount of time spent by the person, and an amount of effort exerted by the person.

13. The computing apparatus of claim 12, wherein the at least one resource includes a number of hours spent by the person on each task.

14. The computing apparatus of claim 12, wherein the processor is further configured to determine a planned amount of the at least one resource that is expected to be expended for each task, and to determine an actual amount of the at least one resource that has been expended.

15. The computing apparatus of claim 14, wherein when the actual amount of the at least one resource that has been expended exceeds the planned amount of the at least one resource that is expected to be expended, the report includes information indicating a wastage amount that corresponds to a difference between the actual amount and the planned amount and an identification of the person that corresponds to the wastage amount.

16. The computing apparatus of claim 11, wherein the processor is further configured to use the issue tracking tool, as the software application used for issue tracking and project management, to identify the plurality of tasks.

17. The computing apparatus of claim 16, wherein the processor is further configured to use the issue tracking tool to provide the electronic tag for each identified task based on a result of the determining.

18. The computing apparatus of claim 16, wherein the processor is further configured to use the issue tracking tool to provide the electronic tag for each identified task for which the waste of the at least one resource is determined as having occurred.

19. The computing apparatus of claim 18, wherein the processor is further configured to provide the electronic tag for each identified task for which the waste of the at least one resource is determined as having occurred with a keyword from among a predetermined plurality of keywords.

20. The computing apparatus of claim 11, wherein the processor is further configured to identify at least one friction point that corresponds to an aspect of the organization associated with excessive waste based on information included in the generated report.

* * * * *